(12) United States Patent
Takarada

(10) Patent No.: US 6,967,748 B1
(45) Date of Patent: Nov. 22, 2005

(54) COLOR IMAGE PICKUP DEVICE

(75) Inventor: Shinichi Takarada, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1003 days.

(21) Appl. No.: 09/868,509

(22) PCT Filed: Oct. 18, 2000

(86) PCT No.: PCT/JP00/07222

§ 371 (c)(1),
(2), (4) Date: Aug. 30, 2001

(87) PCT Pub. No.: WO01/30087

PCT Pub. Date: Apr. 26, 2001

(30) Foreign Application Priority Data

Oct. 19, 1999 (JP) ................................ 11-297136

(51) Int. Cl.[7] .......................... H04N 1/028; H04N 1/46; G06K 9/32
(52) U.S. Cl. ........................ 358/1.9; 358/525; 358/512; 358/443; 382/299; 382/300; 348/273; 348/276; 348/280
(58) Field of Search .......................... 358/1.2, 1.9, 512, 358/514, 515, 518, 520, 524, 525, 530; 382/148, 382/299, 300, 264, 254, 263; 345/698; 348/273–282

(56) References Cited

U.S. PATENT DOCUMENTS 5,374,956 A * 12/1994 D'Luna ....................... 348/275
5,382,976 A    1/1995 Hibbard
5,552,827 A    9/1996 Maenaka et al.
5,614,947 A * 3/1997 Tanizoe et al. ............. 348/241
6,128,036 A * 10/2000 Sakurai et al. ........... 348/222.1
6,133,953 A * 10/2000 Okada ......................... 348/272
6,822,680 B1 * 11/2004 Kanda ......................... 348/273

FOREIGN PATENT DOCUMENTS

EP    0469836    2/1992
EP    0731616    9/1996

(Continued)

OTHER PUBLICATIONS

Hiromasa Mizuki et al., "Solid-State Color Image Pickup Apparatus", U.S. Appl. No. 09/674,933, filed Feb. 28, 2001.

*Primary Examiner*—Kimberly Williams
*Assistant Examiner*—Beniyam Menberu
(74) *Attorney, Agent, or Firm*—Wenderoth, Lind & Ponack, L.L.P.

(57) ABSTRACT

A color image pickup device is provided with image pickup elements having color separation filters, respectively, wherein one array pattern of the color separation filters corresponds to four pixels that are vertically and horizontally adjacent to each other; a storage circuit for storing filter-transmitted signals corresponding to the respective pixels and supplied from the image pickup elements; a signal processing circuit for obtaining a luminance value and a color-difference signal for each pixel, using the filter-transmitted signals corresponding to the respective pixels and stored in the storage circuit; and a resolution conversion circuit for performing interpolation using the luminance values and the color-difference signals outputted from the signal processing circuit, and the filter-transmitted signals corresponding to the respective pixels and outputted from the image pickup elements, thereby generating a luminance value and a color-difference signal corresponding to a pixel to be newly generated. Thereby, a favorable image having no blur is obtained with a very small amount of arithmetic.

20 Claims, 6 Drawing Sheets

FOREIGN PATENT DOCUMENTS

| | | |
|---|---|---|
| JP | 4-88782 | 3/1992 |
| JP | 7-59098 | 3/1995 |
| JP | 7-93531 | 4/1995 |
| JP | 7-99664 | 4/1995 |
| JP | 7-236147 | 9/1995 |
| JP | 10-164602 | 6/1998 |
| WO | 96/07275 | 3/1996 |
| WO | 99/59345 | 11/1999 |

* cited by examiner

COLOR IMAGE PICKUP DEVICE

TECHNOLOGICAL FIELD

The present invention relates to a color image pickup device and, more particularly, to signal processing for processing filter-transmitted signals read from color image pickup elements to obtain higher resolution.

BACKGROUND ART

Conventionally, in order to enhance the resolution of a video signal from a color image pickup device such as a CCD, filter-transmitted signals from CCD elements each having a color filter is subjected to arithmetic operation with peripheral pixels to generate luminance signals at positions corresponding to the respective CCD elements and, thereafter, resolution conversion is carried out using these luminance data. Hereinafter, a conventional CCD and signal processing thereof will be described with reference to FIG. 2.

FIG. 2 is a block diagram illustrating a conventional color image pickup device. In the figure, 201 denotes an optical system which forms an image of an object on the surface of a CCD 202. The CCD 202 converts the object image so formed into an electric signal, and a color separation filter is disposed on each CCD element to take out color data. A signal 203 outputted from the CCD 202 is an analog quantity, and each element of the CCD 202 has a voltage value according to the intensity of light transmitted through the corresponding color separation filter. 204 denotes an A/D converter which digitizes the analog signal 203 to convert the analog signal 203 into a signal 205 having 256 levels of gradation (0~255) for each pixel. 206 denotes a storage circuit which stores the digital signal 205 and permits random access to each value, to permit arithmetic operation with peripheral pixels in the signal processing that will be described later. 208 denotes a signal processing circuit which performs processing to obtain luminance values and color-difference signals from the digital signal 207 stored in the storage circuit 206.

The process steps up to mentioned above are generally performed by the conventional color image pickup device 210, and the signal processing circuit 208 outputs the luminance values and color-difference signals 209 to the outside. When higher resolution is desired, a resolution conversion circuit 211 performs interpolation using the luminance values and color-difference signals 209 outputted from the signal processing circuit 208 to generate luminance signals and color-difference signals of pixels to be newly generated, and outputs the luminance values and color-difference signals 212 larger in number than the luminance values and color-difference signals 209 outputted from the signal processing circuit 208.

Next, the signal processing performed by the signal processing circuit 208 will be described specifically with reference to FIG. 3. FIG. 3 is a diagram illustrating an array of color filters on the CCD 202 in the conventional color image pickup device. In FIG. 3, Mg indicates elements with magenta filters, G indicates elements with green filters, Cy indicates elements with cyan filters, and Ye indicates elements with yellow filters. On the CCD 202, these elements are arranged in a checker pattern, and a pattern in a region enclosed with a bold frame is repeated.

The signal processing circuit 208 obtains luminance values and color-difference signals from the signals transmitted through these single-color filters. For example, when the luminance value at a pixel 301 is to be obtained, the average of the luminance values of four pixels 301(Mg), 302(G), 305(Cy), and 306(Ye), i.e., (Me+G+Cy+Ye)/4, is obtained in approximation, and this average is regarded as the luminance value at the pixel 301. Further, also when the luminance value at the pixel 302 is to be obtained, in like manner as mentioned for the luminance value of the pixel 301, the average of 2×2 pixels (302, 303, 306, 307) with the pixel 302 in the upper left corner, is obtained, and this average is regarded as the luminance value at the pixel 302.

As described above, luminance values in one-to-one correspondence to the respective pixels of the CCD can be obtained by calculating, in any case, the average of 2×2 pixels having the target pixel in the upper left corner and including each of Mg, C, Cy, and Ye.

Further, a color-difference signal is specified by Cr indicating a difference between a red component and a luminance value, and Cb indicating a difference between a blue component and the luminance value, and a Cr signal is obtained by (Ye+Mg)−(Cy+G) while a Cb signal is obtained by (Cy+Mg)−(Ye+G). Generally, a color-difference signal comprising a pair of Cr and Cb is provided for every four pixels because the human eyes are relatively insensitive to the resolution relating to colors.

As described above, the luminance values and color-difference signals 209 outputted from the conventional color image pickup device 210 are composed of the luminance values having resolutions in one-to-one correspondence to the respective pixels of the CCD 202, and the color-difference signals each comprising a pair of Cr and Cb and having ¼ resolutions with respect to the pixels of the CCD 202.

Next, a description will be given of the processing contents by the resolution conversion circuit 211 that receives the luminance values and color-difference signals 209 and performs resolution conversion, with reference to FIG. 5. Although many methods for resolution conversion have been proposed, linear interpolation using peripheral pixels is most commonly used. FIG. 5 is a diagram for explaining linear interpolation performed by the resolution conversion circuit 211 of the conventional color image pickup device. In the figure, G denotes a pixel to be newly formed, A denotes a pixel position on the CCD 101 that is closest to the new pixel G, B to E denote pixel positions on the CCD 101 that are adjacent to the pixel A, and F denotes a pixel position on the CCD 101 that is adjacent to the pixels C and D. Further, i denotes a distance to the pixel G in the horizontal direction when the pixel A is the target pixel, and j denotes a distance to the pixel G in the vertical direction when the pixel A is the target pixel.

Since linear insertion is carried out in linear interpolation, when the distance between the respective pixels is 1 and $0 \leq i < 1$ and $0 \leq j < 1$, the luminance value and the color-difference signal of the new pixel G are obtained as follows:

$$G = (1-i)((1-j)A + jC) + i((1-j)D + jF)$$

Meanwhile, Japanese Published Patent Application No. Hei. 7-93531 discloses another method for resolution conversion wherein, simultaneously with linear interpolation, edges are specially processed so that the edges are not blurred, and the processed edges are superposed on the result of linear interpolation.

However, the above-mentioned conventional techniques have the following drawbacks. First of all, in the conventional linear interpolation, since averaging with the peripheral pixels is carried out, image is undesirably smoothed, resulting in blurred image that lacks sharpness even at edges.

On the other hand, although the process disclosed in Japanese Published Patent Application No. Hei. 7-93531 provides relatively favorable processing results, arithmetic operation for edge formation is needed in addition to that for linear interpolation, resulting in longer processing hours, or increased cost when the process is implemented by hardware.

Moreover, in either of these conventional methods, when interpolating, for example, a point placed between the pixels 301, 302, 305, and 306 shown in FIG. 3, the luminance value of the pixel 306 is used as an element for the interpolation. However, since the luminance value of the pixel 306 was generated using the luminance values of the pixel 311 and others, the pixel to be generated by the interpolation is influenced by the very distant pixels. This means that the value of the new pixel obtained by the interpolation consequently becomes a value obtained by smoothing the image over a wide range, and the image is blurred.

The present invention is made to solve the above-mentioned problems and has for its object to provide a high-resolution color image pickup device that can provide favorable processing result having no blur, with a very small amount of arithmetic.

DISCLOSURE OF THE INVENTION

In order to achieve the above-mentioned object, a color image pickup device according to Claim 1 of the present invention is provided with image pickup elements having color separation filters, respectively, wherein one array pattern of the color separation filters corresponds to four pixels that are vertically and horizontally adjacent to each other; a storage circuit for storing filter-transmitted signals corresponding to the respective pixels and supplied from the image pickup elements; a signal processing circuit for obtaining a luminance value and a color-difference signal for each pixel, using the filter-transmitted signals corresponding to the respective pixels and stored in the storage circuit; and a resolution conversion circuit for performing interpolation using the luminance values and the color-difference signals outputted from the signal processing circuit, and the filter-transmitted signals corresponding to the respective pixels and outputted from the image pickup elements, thereby generating a luminance value and a color-difference signal corresponding to a pixel to be newly generated.

According to the color image pickup device described in Claim 1, when generating a new pixel, the resolution conversion circuit obtains the luminance value of the new pixel to be generated, using not only the luminance values and color-difference signals obtained by performing arithmetic with the peripheral pixels in the signal processing circuit but also the filter-transmitted signals from the respective image pickup elements, whereby blurs due to the influence of the peripheral pixels are reduced, and a high-contrast and high-resolution luminance image is obtained.

Further, according to Claim 2 of the present invention, in the color image pickup device according to Claim 1, the resolution conversion circuit performs interpolation using the luminance value of a pixel that is placed in a position closest to the pixel to be newly generated, which luminance value is outputted from the signal processing circuit, and using the filter-transmitted signals corresponding to the peripheral pixels of the pixel placed in the position closest to the pixel to be newly generated, which filter-transmitted signals are outputted from the image pickup elements.

According to the color image pickup device described in Claim 2, when generating a new pixel, the resolution conversion circuit obtains the luminance value of the new pixel to be generated, using the luminance value of a pixel that is placed in a position closest to the new pixel, which luminance value is obtained by performing arithmetic with the peripheral pixels in the signal processing circuit, and using the filter-transmitted signals corresponding to the peripheral pixels of the pixel placed in the position closest to the new pixel, whereby blurs due to the influence of the peripheral pixels are reduced, and a high-contrast and high-resolution luminance image is obtained.

Further, according to Claim 3 of the present invention, in the color image pickup device according to Claim 1 or Claim 2, the color separation filters corresponding to the four pixels forming each array pattern of the color separation filters on the image pickup elements are composed of two whole-color-transmission filters (hereinafter referred to as W filters) and two color filters, and the W filters and the color filters are arranged in a checker pattern.

According to the color image pickup device described in Claim 3, the W filters, which permit the filter-transmitted signals from the image pickup elements to be used as luminance values, are arranged in a checker pattern, thereby reducing the amount of arithmetic to obtain the luminance value and color-difference signal of each pixel by the signal processing circuit, and the amount of arithmetic to obtain the luminance value and color-difference signal of the new pixel to be generated.

Further, according to Claim 4 of the present invention, in the color image pickup device according to Claim 3, the color filters are a cyan-transmitting filter and a yellow-transmitting filter.

According to the color image pickup device described in Claim 4, the cyan-transmitting filter and the yellow-transmitting filter which are complementary colors of red and blue, respectively, are used as the color filters of the color separation filters on the image pickup elements, whereby the amount of arithmetic to obtain the color-difference signal is minimized.

Further, according to Claim 5 of the present invention, in the color image pickup device according to Claim 3 or Claim 4, when the pixel placed in the position closest to the pixel to be newly generated is a color filter pixel, said resolution conversion circuit obtains the luminance value of the pixel to be newly generated, by calculating (a difference between filter-transmitted signals of W filter pixels adjacent to the color filter pixel)×(a factor based on the position of the pixel to be newly generated)+(the luminance value of the color filter pixel outputted from the signal processing circuit).

According to the color image pickup device described in Claim 5, when generating a new pixel; the resolution conversion circuit obtains the luminance value of the new pixel to be generated, using the luminance value of a pixel that is placed in a position closest to the new pixel, which luminance value is obtained by performing arithmetic with the peripheral pixels in the signal processing circuit, and using the filter-transmitted signals corresponding to the peripheral pixels of the pixel placed in the position closest to the new pixel, whereby blurs due to the influence of the peripheral pixels are reduced, and a high-contrast and high-resolution luminance image is obtained.

Further, according to Claim 6 of the present invention, in the color image pickup device according to Claim 3 or Claim 4, when the pixel placed in the position closest to the pixel to be newly generated is a W filter pixel, said resolution conversion circuit obtains the luminance value of the pixel to be newly generated, by calculating (a difference between filter-transmitted signals of color filter pixels adjacent to the W filter pixel)×(a factor based on the position of the pixel to be newly generated)+(the luminance value of the color filter pixel outputted from the signal processing circuit).

According to the color image pickup device described in Claim 6, when generating a new pixel, the resolution conversion circuit obtains the luminance value of the new pixel to be generated, using the luminance value of a pixel that is placed in a position closest to the new pixel, which luminance value is obtained by performing arithmetic with the peripheral pixels in the signal processing circuit, and using the filter-transmitted signals corresponding to the peripheral pixels of the pixel placed in the position closest to the new pixel, whereby blurs due to the influence of the peripheral pixels are reduced, and a high-contrast and high-resolution luminance image is obtained.

Further, according to Claim 7 of the present invention, in the color image pickup device according to Claim 3 or Claim 4, when the pixel placed in the position closest to the pixel to be newly generated is a W filter pixel, said resolution conversion circuit obtains the luminance value of the pixel to be newly generated, by calculating (a difference between filter-transmitted signals of W filter pixels that are placed with a color filter pixel between them)×(a factor based on the position of the pixel to be newly generated)+(the luminance value of the color filter pixel outputted from the signal processing circuit).

According to the color image pickup device described in Claim 7, when generating a new pixel, the resolution conversion circuit obtains the luminance value of the new pixel to be generated, using the luminance value of a pixel that is placed in a position closest to the new pixel, which luminance value is obtained by performing arithmetic with the peripheral pixels in the signal processing circuit, and using the luminance values of pixels corresponding to the W filters whose filter-transmitted signals can be used as luminance values, whereby blurs due to the influence of the peripheral pixels are reduced, and a high-contrast and high-resolution luminance image is obtained and, furthermore, resolution conversion is realized by simple addition, subtraction, and shift operation.

Further, according to Claim 8 of the present invention, in the color image pickup device according to any of Claims 1 to 7, the resolution conversion circuit obtains a color-difference signal of the pixel to be newly generated, by performing liner interpolation using the color-difference signals obtained by the signal processing circuit.

According to the color image pickup device described in Claim 8, the resolution conversion circuit obtains the color-difference signal of the new pixel to be generated, by performing linear interpolation using the color-difference signals which are obtained by the signal processing circuit using the filter-transmitted signals of the vertically and horizontally adjacent four pixels. Therefore, with respect to colors to which the resolution of human eyes is low, contrast is not made to avoid a sporadic change, thereby preventing the image quality from being degraded due to pseudo colors or the like.

Further, according to Claim 9 of the present invention, in the color image pickup device according to any of Claims 1 to 7, the resolution conversion circuit obtains a color-difference signal of the pixel to be newly generated, by using the filter-transmitted signals corresponding to the respective pixels and outputted from the image pickup elements.

According to the color image pickup device described in Claim 9, the resolution conversion circuit obtains the color-difference signal of the new pixel to be generated, by using the filter-transmitted signals of pixels positioned in close vicinity of the new pixel. Therefore, with respect to colors to which the resolution of human eyes is low, contrast is not made to avoid a sporadic change, thereby preventing the image quality from being degraded due to pseudo colors or the like.

BEST MODE TO EXECUTE THE PRESENT INVENTION

Embodiment 1

A color image pickup device according to a first embodiment of the present invention will be described with reference to FIGS. 1, and 5~8.

Figure 1:
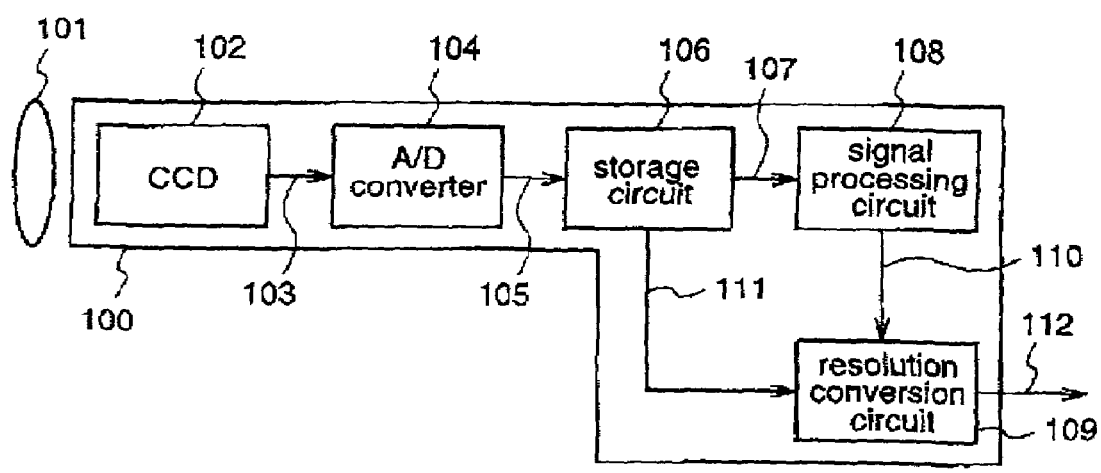
FIG. 1 is a block diagram illustrating a color image pickup device according to a first embodiment of the present invention.
Figure 2:
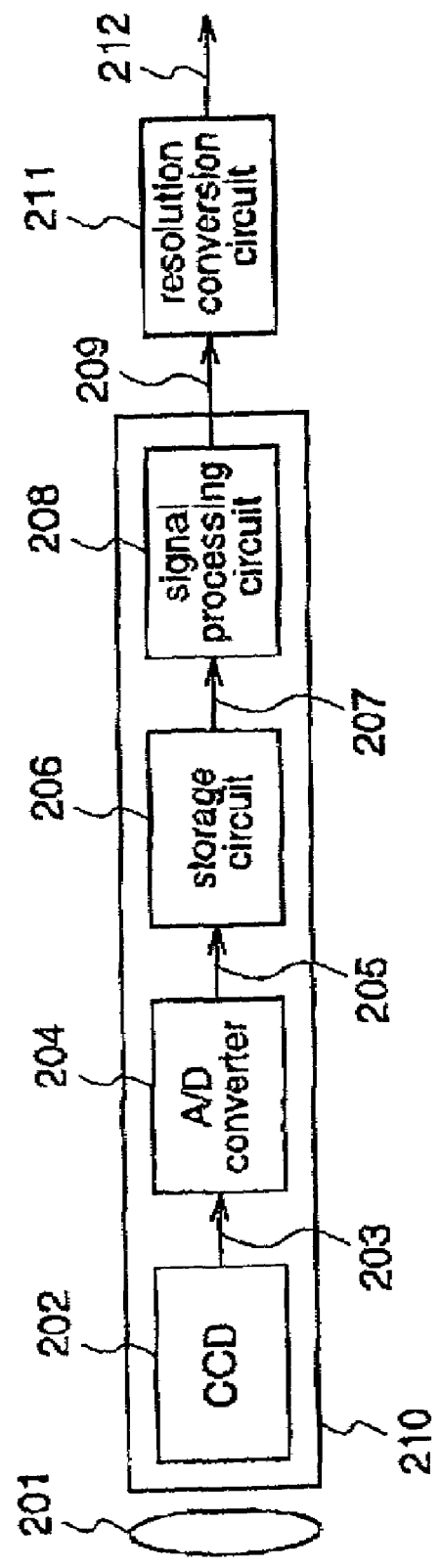
FIG. 2 s a block diagram illustrating a conventional color image pickup device.
Figure 3:
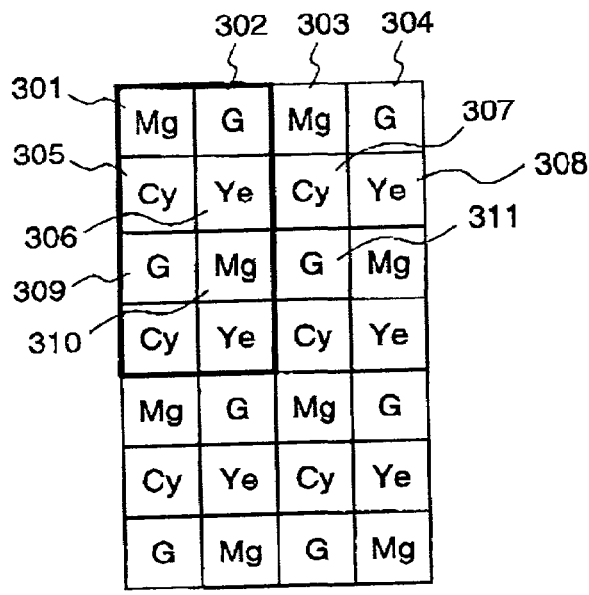
FIG. 3 is a diagram illustrating an example of arrangement of color filters on a CCD in the conventional color image pickup device.

In FIG. 1, 101 denotes an optical system which forms an image of an object on the surface of a CCD 102. The CCD 102 converts the object image so formed into an electric signal, and a color separation filter is disposed on each CCD element to take out color data. A filter-transmitted signal 103 outputted from the CCD 102 is an analog quantity, and each element of the CCD 102 has a filter-transmitted signal, i.e., a voltage value according to the intensity of light transmitted through the corresponding color separation filter. 104 denotes an A/D converter which digitizes the analog signal 103 to convert it into a digital signal 105 having 256 levels of gradation (0~255) for each pixel. 106 denotes a storage circuit which stores the digital signal 105 and permits random access to each value, to permit arithmetic operation with peripheral pixels in the signal processing that will be described later. 108 denotes a signal processing circuit which performs processing to obtain luminance values and color-difference signals from the digital signal 105 stored in the storage circuit 105. 109 denotes a resolution conversion circuit which performs resolution conversion utilizing values 111 from the color filters of the CCD stored in the storage circuit 106 as well as the luminance values and color-difference signals 110 obtained by the signal processing circuit 108, and outputs luminance values and color-difference signals 112 corresponding to pixels larger in number than the pixels of the CCD 102.

Next, the signal processing performed by the signal processing circuit 108 will be described specifically with reference to FIGS. 5~7.

The signal processing circuit 108 performs processing to obtain luminance values corresponding to the respective pixels from the filter-transmitted signals. FIG. 6 is a diagram illustrating an example of arrangement of color filters on the CCD 102 in the color image pickup device according to the present invention. In the figure, W denotes elements with W filters, Cy denotes elements with filters of cyan that is a complementary color of red, and Ye denotes elements with filters of yellow that is a complementary color of blue. On the CCD 102, these elements are arranged in a checker pattern, and a pattern in a region enclosed with a bold frame is repeated.

In each W filter section, a signal transmitted through the W filter can be used as a luminance value. However, in Cy filter and Y filter sections, luminance values must be obtained using peripheral pixels.

Hereinafter, how to obtain the luminance value in the Cy filter section by the signal processing circuit 108 will be described with reference to FIG. 7.

Figure 7:
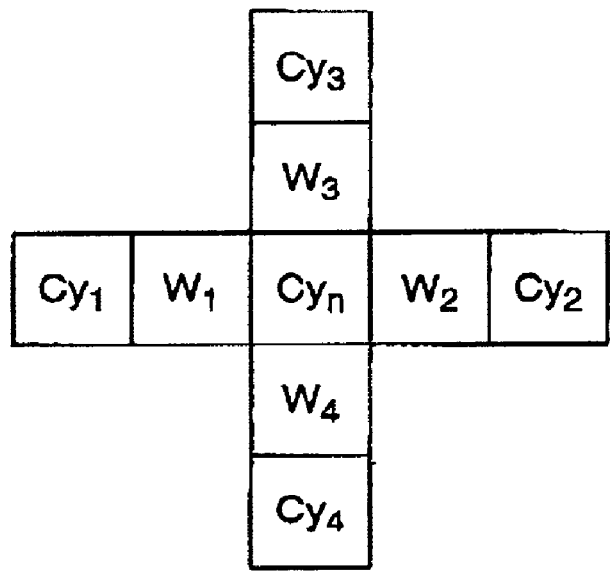
FIG. 7 is a diagram illustrating an example of arrangement of color filters on a CCD in the color image pickup device according to the first embodiment of the present invention.

FIG. 7 is a diagram illustrating an example of arrangement of color filters on the CCD 102 in the color image pickup device according to the first embodiment. In the figure, Cyn positioned in the center is a pixel the luminance value of which will be generated hereafter. Further, $Cy_1$, $W_1$, $Cy_2$, and $W_2$ are pixels positioned in the horizontal direction with respect to the Cyn, and $Cy_3$, $W_3$, $Cy_4$, and $W_4$ are pixels positioned in the vertical direction with respect to the Cyn. These peripheral pixels are used in the process to obtain the luminance value of the Cyn in the center.

Next, a description will be given of the process to obtain the luminance value. Since the luminance value of the pixel corresponding to the Cy filter can be obtained by adding the red component to the signal transmitted through the Cy filter, the red component is generated from the peripheral pixels. At this time, the red component is generated utilizing either the vertical direction or the horizontal direction. Since the precision can be increased without being affected by the edges and the like when using either direction having the stronger correlation, initially, the vertical correlation and the horizontal correlation are compared with each other. Assuming that the horizontal correlation is a difference between $W_1$ and $W_2$ and the vertical correlation is a difference between $W_3$ and $W_4$, the vertical correlation is strong when $|W_1-W_2|>|W_3-W_4|$, and the horizontal correlation is strong when $|W_1-W_2|<|W_3-W_4|$. So, when the horizontal correlation is strong, the average of the red components in the $W_1$ position and the $W_2$ position is added to the signal transmitted through the Cyn filter, thereby obtaining the luminance value in the Cyn position. The red component in the $W_1$ position is obtained by subtracting the cyan component in that position from $W_1$, and the cyan component in the $W_1$ position is obtained as the average of $Cy_1$ and Cyn. Accordingly, the red component in the $W_1$ position is obtained as follows:

$(W_1-(Cyn+Cy_1)/2)$

Likewise, the red component in the $W_2$ position is obtained as follows:

$(W_2-(Cyn+Cy_2)/2)$

Therefore, the red component in the Cyn position is obtained as follows:

$((W_1-(Cyn+Cy_1)/2)+(W_2-(Cyn+Cy_2)/2))/2$

By adding the Cyn-filter-transmitted signal to the obtained red component, the luminance value in the Cyn position is obtained as follows:

$$Cyn/2+W_1/2+W_2/2-Cy_1/4-Cy_2/4 \qquad (1)$$

Likewise, when the vertical correlation is strong, the luminance value in the Cyn position is obtained as follows:

$$Cyn/2+W_3/2+W_4/2-Cy_3/4-Cy_4/4 \qquad (2)$$

Further, as well as the Cy filter section, the luminance value in the Ye filter section must be obtained utilizing the peripheral pixels and, hereinafter, how to obtain the luminance value in the Ye filter section will be described with reference to FIG. 8.

Figure 8:
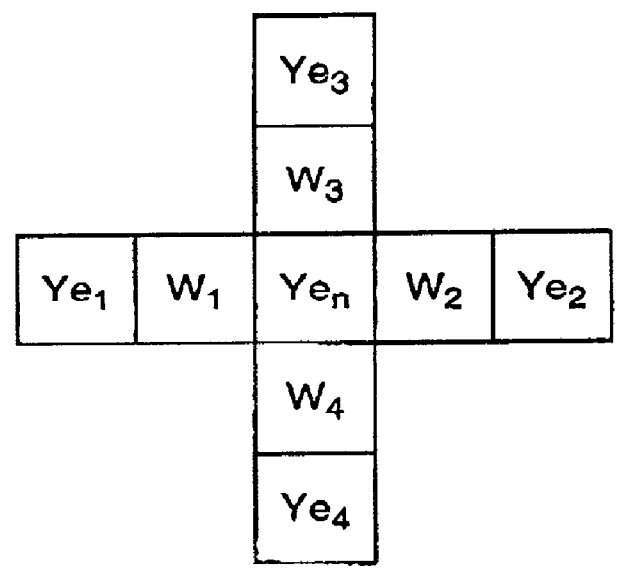
FIG. 8 is a diagram illustrating an example of arrangement of color filters on a CCD in the color image pickup device according to the first embodiment of the present invention.

FIG. 8 is a diagram illustrating an example of arrangement of color filters on the CCD 102 in the color pickup device according to the first embodiment of the invention. In the figure, Yen positioned in the center is a pixel the luminance value of which will be generated hereafter. Further, $Ye_1$, $W_1$, $Ye_2$, and $W_2$ are pixels positioned in the horizontal direction with respect to the Yen, and $Ye_3$, $W_3$, $Ye_4$, and $W_4$ are pixels positioned in the vertical direction with respect to the Yen. These peripheral pixels are used in the process of obtaining the luminance value of the Yen positioned in the center.

Since the positional relationships among the peripheral pixels of the Yen are identical to the positional relationships among the peripheral pixels in the case of the Cy filter, the luminance signal of the Yen can be obtained by the same procedure as that described for the Cy filter. That is, Cy in formulae (1) and (2) is replaced with Ye, and the relationship between the vertical correlation and the horizontal correlation is obtained in the same manner as described for the case of obtaining the luminance value of the Cyn, and the luminance signal of the Yen can be obtained as follows according to the relationship between the vertical correlation and the horizontal correlation.

The luminance value in the Yen position when the horizontal correlation is strong is as follows:

$Yen/2+W_1/2+W_2/2-Ye_1/4-Ye_2/4$

The luminance value in the Yen position when the vertical correlation is strong is as follows:

$Yen/2+W_3/2+W_4/2-Ye_3/4-Ye_4/4$

Figures 5, 6:
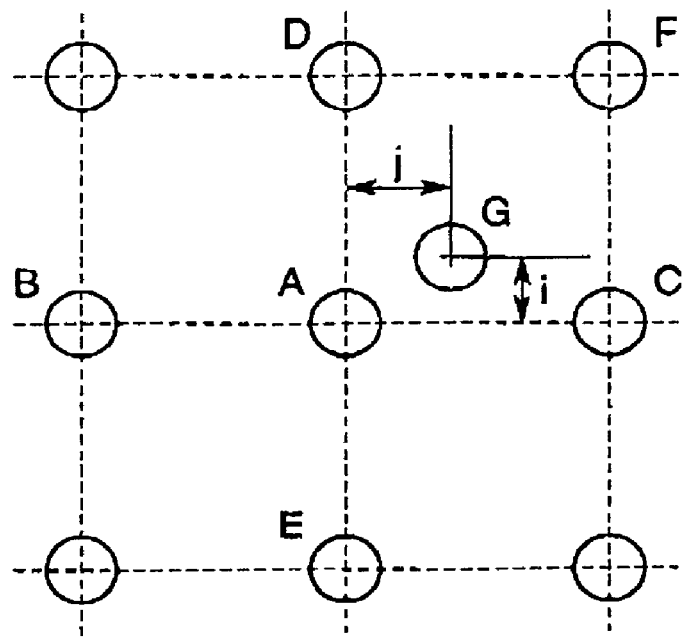
FIG. 5 is a diagram for explaining interpolation performed by a resolution conversion circuit included in the color image pickup device according to the prior art or the first or second embodiment of the present invention.
FIG. 6 is a diagram illustrating an example of arrangement of color filters on a CCD in the color image pickup device according to the first or second embodiment of the invention.

In this way, since the color separation filters as shown in FIG. 6 are disposed on the respective elements of the CCD 102, when the luminance values corresponding to these elements are obtained by the signal processing circuit 108, the luminance values in the W filter sections can be obtained without performing arithmetic operation with the peripheral pixels. Further, also in the color filter sections, although the utilization range of the peripheral pixels is broader than that of the conventional technique, since the present invention uses the luminance values in the W filter sections and thereby the weight on the target pixel is ½ while the conventional technique uses the average of four pixels and thereby the weight on the target pixel is ¼, an image with very little blur as a whole can be obtained.

Next, how to obtain a color-difference signal by the signal processing circuit 108 will be described. Like the conventional method, a color-difference signal comprising a pair of Cr and Cb will be obtained for every four pixels. Hereinafter, a description will be given of the case where a color-difference signal comprising a pair of Cr and Cb is obtained for four pixels enclosed with the bold frame shown in FIG. 6. It is to be noted that Cr is a difference between the red component and the luminance value, and Cb is a difference between the blue component and the luminance value. Hereinafter, the manners to obtain Cr and Cb will be described separately.

In order to obtain Cr, initially, the influence quantity to the luminance value of red included in light is obtained by W−Cy. Although there are two W in the bold frame shown in FIG. 6, either may be used. Since the red component used to obtain Cr means the absolute value of the luminance value of red, it is necessary to correct W−Cy by multiplying it with a constant. Here, the order of 0.3, which is generally used as the influence ratio to the luminance value of red, is used, and the red component is obtained by (W−Cy)/0.3. Accordingly, Cr as a difference between the red component and the luminance value is obtained as follows;

$$Cr=(W-Cy)/0.3-W=(0.7W-Cy)/0.3 \quad (3)$$

Next, in order to obtain Cb, initially, the influence quantity to the luminance value of blue included in light is obtained by W−Ye. Although there are two W in the bold frame in FIG. 6, either may be used like in the above-mentioned case of obtaining Cr. Further, since the blue component used to obtain Cb means the absolute value of the luminance value of blue, it is necessary to correct W−Ye by multiplying it with a constant. Here, the order of 0.1, which is generally used as the influence ratio to the luminance value of blue, is used, and the blue component is obtained by (W−Ye)/0.1. Accordingly, Cb as a difference between the blue component and the luminance value is obtained as follows:

$$Cb=(W-Ye)/0.1-W=(0.9W-Ye)/0.1 \quad (4)$$

In this way, since the Cy filter and the Ye filter which are complementary colors of red and blue, respectively, are used as the color separation filters on the image pickup elements, the amount of arithmetic to obtain the color-difference signal can be reduced.

While in this first embodiment the amount of arithmetic to obtain the red component and the blue component using Cy and Ye, which are complementary colors of red and blue, is minimized, this is merely an example. Even when using different two kinds of color filters other than mentioned above, a favorable image with less blurs can be obtained by very simple arithmetic as compared with the conventional technique.

Hereinafter, the process performed by the resolution conversion circuit 109 will be described with reference to FIGS. 5 and 6.

FIG. 5 is a diagram for explaining interpolation performed by the resolution conversion circuit 109 in the color image pickup device according to the first embodiment of the invention. In the figure, G denotes a pixel to be newly formed, and A denotes a pixel position on the CCD 102 that is closest to the new pixel G, and B to E denote pixel positions on the CCD 102 that are adjacent to the pixel A.

Hereinafter, a description will be given of interpolation in the case where the pixel A is a W filter When the pixel A is a W filter, as shown in FIG. 6, there are two cases where the pixel B and the pixel C are Cy filters and the pixel D and the pixel E are Ye filters, and where the pixel B and the pixel C are Ye filters and the pixel D and the pixel E are Cy filters. However, both cases are under the same condition when the image of FIG. 6 is rotated by 90 degrees, and the luminance value of the new pixel G can be obtained by the same process and, therefore, only the case where the pixel B and the pixel C are Cy filters and the pixel D and the pixel E are Ye filters will be described hereinafter.

In order to obtain the luminance value of the new pixel G, initially, the amount of change in luminance values must be obtained using the luminance values of pixels B and C. However, if the luminance values of the pixels B and C, which have already been obtained by arithmetic operation with the peripheral pixels in the signal processing circuit 108, are used, the generated image might become blurred as in the conventional technique.

Therefore, in this first embodiment of the invention, the amount of change in luminance values is obtained on the premise that the change in luminance values between pixels is in proportion to the difference in the filter-transmitted signals between the pixels. For example, since the pixel B and the pixel C are Cy filters, the luminance values at the pixels B and C are composed of only the cyan component. However, in a natural image, it is rare that only a specific light component changes when the contrast changes and, generally, all color components change at equal ratio. Accordingly, as described above, it is possible to express the amount of change in luminance values on the assumption that the change in the luminance values from the pixel B to the pixel C is in proportion to the difference in the filter-transmitted signals B' and C' (C'−B') between the pixel B and the pixel C.

Therefore, assuming that the transmission ratio of the Cy filter to the W filter in the white light is Q (Q<1), the change in the luminance values from the pixel B to the pixel C is expressed by (C'−B')/Q. Likewise, assuming that the transmission ratio of the Ye filter to the W filler in the white light is R (R<1), the change in the luminance values from the pixel D to the pixel E is expressed by (E'−D')/R. Here, B' to E' are the filter-transmitted signals corresponding to the pixels B to E, respectively.

Accordingly, the luminance value of the new pixel G can be obtained by using the luminance value of the pixel A, the amount of change in the luminance values from the pixel B to the pixel C, and the amount of change in the luminance values from the pixel D to the pixel E, as follows:

$$A+j\times(C'-B')/Q/2-i\times(E'-D')/R/2$$

When the order of 0.7 is used as the value of Q and the order of 0.9 is used as the value of R, the luminance value of the new pixel G is obtained as follows:

$$A+j\times(C'-B')/0.7/2-i\times(E'-D')/0.9/2$$

That is, the resolution conversion circuit 109 captures the luminance value of the pixel A from the path 110 shown in FIG. 1, and obtains the amount of change in the luminance values from the pixel B to the pixel C and the amount of change in the pixel values from the pixel D to the pixel E, by using the filter-transmitted signals of the pixels B to E that are captured from the path 111, without using the luminance values from the path 110 that might cause blurred image.

Next, when the pixel A is a Cy filter, since all of the pixels B to E are W filters as seen from FIG. 6, the values of the pixels B to E can be used as the luminance values. Accordingly, the luminance value of the new pixel G is obtained by using the luminance values of the pixels B to E outputted from the signal processing circuit 108 as they are, without using the luminance values obtained by arithmetic operation with the peripheral pixels.

Hereinafter, a description will be given of the case where the luminance value of the new pixel G is obtained using the luminance values outputted from the signal processing circuit 108.

Since the amount of change in the luminance values from the pixel B to the pixel C (horizontal direction) is (C−B)/2, the new pixel G as a component in the horizontal direction, which is distance j apart from the pixel A in the horizontal direction, may have a luminance value that is j×(C−B)/2 larger than the luminance value of the pixel A. Further, also in the vertical direction, the luminance value of the pixel G is i×(E−D)/2 smaller than the luminance value of the pixel A. Accordingly, the luminance value of the new pixel G can be obtained by using the luminance value of the pixel A, the amount of change in the luminance values from the pixel B to the pixel C, and the amount of change in the luminance values from the pixel D to the pixel E, as follows:

$$A+j*(C-B)/2-i*(E-D)/2 \qquad (5)$$

Although the resolution conversion circuit 109 captures the luminance values of the pixels A to E from the path 110 shown in FIG. 1, since all of the pixels B to E are W filters when the pixel A is a Cy filter, the luminance values outputted from the path 110 and the filter-transmitted signals outputted from the path 111 have the same values and, therefore, the resolution conversion circuit 109 may capture the values of the pixels B to E from the path 111, like in the above-mentioned case where the pixel A is a W filter.

Even when the pixel A is a Ye filter, since all of the peripheral filters B to E are W filters like in the case where the pixel A is a Cy filter (refer to FIG. 6), the luminance value of the new pixel G can be obtained in the same manner as described for the case where The pixel A is a Cy filter.

As described above, when generating a new pixel, the resolution conversion circuit obtains the luminance value of the new pixel G by using the luminance value of the pixel placed in the position closest to the new pixel, which luminance value is obtained by arithmetic operation with the peripheral pixels in the signal processing circuit, and using the filter-transmitted signals of the peripheral pixels of the pixel positioned closest to the new pixel. Therefore, blurs due to the influence of the peripheral pixels can be reduced, resulting in a high-contrast and high-resolution luminance image.

In this first embodiment, when the pixel A is a W filter, the new pixel G is obtained by using the filter-transmitted signals of the pixels B to E captured from the path 111 to obtain a high-resolution luminance image. However, even when the new pixel G is obtained by using the luminance values of the pixels B to E captured from the path 110 as in the conventional technique, the amount of arithmetic to obtain the pixel G can be reduced by obtaining the luminance value of the pixel G using formula (5), although there is the risk of blurs.

As for a method of obtaining, by interpolation, a color-difference signal at the pixel G to be newly generated, since the resolution of human eyes is low with respect to colors, it is useless to make a contrast, and a sudden change degrades the image quality as a pseudo color. Accordingly, blurs are preferable for the color difference and, therefore, linear interpolation is carried out in this first embodiment as in the conventional technique.

Embodiment 2

Figure 4:
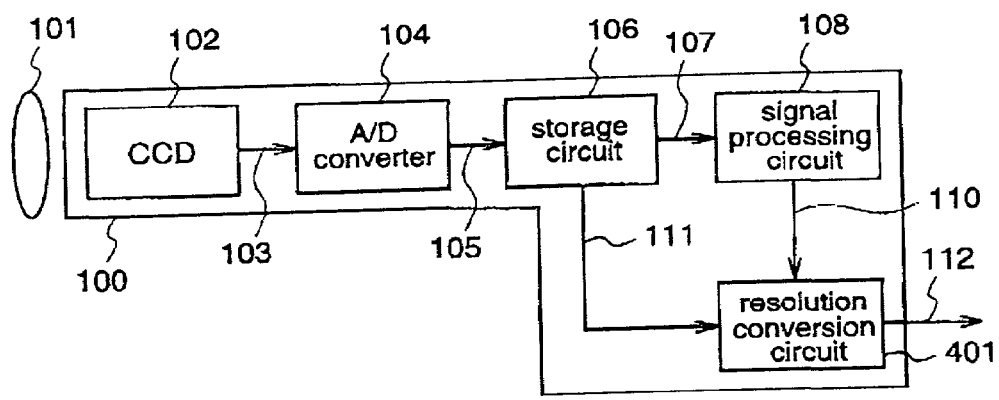
FIG. 4 is a block diagram illustrating a color image pickup device according to a second embodiment of the present invention.

Hereinafter, a color image pickup device according to a second embodiment of the present invention will be described with reference to FIGS. 4 to 6, 9, and 10. FIG. 4 is a block diagram illustrating a color image pickup device according to the second embodiment of the invention. As shown in FIG. 4, the constituents of the color image pickup device according to the second embodiment are identical to those of the first embodiment except a resolution conversion circuit 401. Therefore, in this second embodiment, a description will be given of only the resolution conversion circuit 401 which is different from the resolution conversion circuit 109 in the color image pickup device of the first embodiment, and the constituents other than the resolution conversion circuit 401 will not be described.

Figure 9:
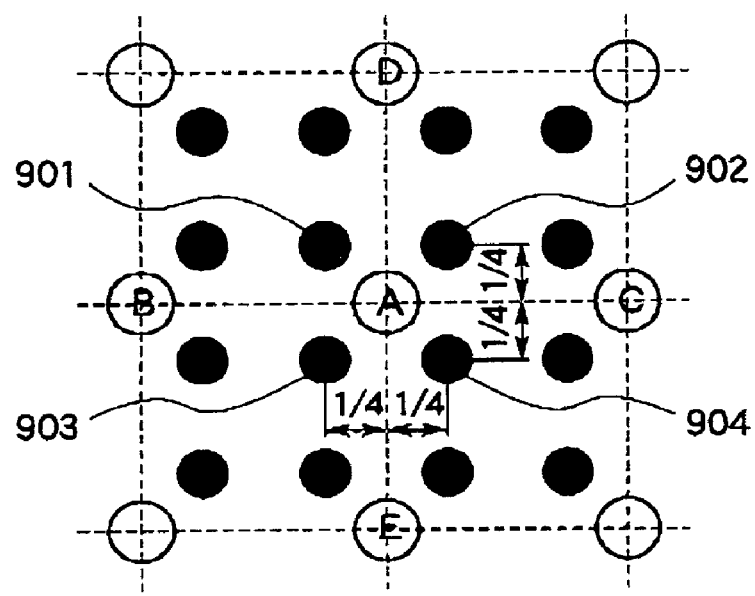
FIG. 9 is a diagram for explaining interpolation performed by a resolution conversion circuit included in the color image pickup device according to the second embodiment of the present invention.

FIG. 9 is a diagram for explaining interpolation performed by the resolution conversion circuit in the color image pickup device according to the second embodiment of the invention. In the figure, white circles indicate pixel positions on the CCD 102, and black circles indicate interpolation positions. As shown in the figure, when generating pixels twice as many as the number of pixels on the CCD 102 in the vertical and horizontal directions, assuming that the distance between adjacent pixels on the CCD 102 is 1, pixels 901 to 904 after interpolation are respectively positioned at a distance of ¼ from the pixel A in the vertical and horizontal directions, that is, the pixels 901 to 904 after interpolation are positioned at equal distances from the pixel A. Therefore, this interpolation can be regarded as expansion of the pixel A on the CCD to the four pixels 901 to 904.

Hereinafter, the process performed by the resolution conversion circuit 401 will be described.

Initially, a description will be given of the process in the case where the pixel A is a Cy filter. Since pixels B to E are W filters when the pixel A is a Cy filter (refer to FIG. 6), the values from the CCD filters corresponding to the pixels B to E can be treated as luminance values, as they are. Therefore, the amount of change in the luminance values from the pixel B to the pixel C (horizontal direction) is (C−B)/2, and the amount of change DX when the pixel A is shifted by ¼ in the horizontal direction is obtained by DX=(C−B)/8. Likewise, the amount of change DY when the pixel A is shifted by ¼ in the vertical direction is obtained by DY=(E−D)/8. Accordingly, the luminance values at 901, 902, 903, and 904 can be obtained as follows, using the luminance value of the pixel A obtained by the signal processing circuit 108, the amount of change when the pixel A is shifted by ¼ in the vertical direction, and the amount of change when the pixel A is shifted by ¼ in the horizontal direction.

| | |
|---|---|
| 901 | A − DX + DY |
| 902 | A l DX + DY |
| 903 | A − DX − DY |
| 904 | A + DX − DY |

As described above, since the W filters and the color filters are arranged in a checker pattern as the color separation filters of the image pickup device, the luminance value in each W filter section can be obtained without performing arithmetic operation with the peripheral pixels.

Therefore, the luminance value of the pixel to be newly generated can be obtained by very simple arithmetic operation and, further, blurs in image that occur during interpolation by the resolution conversion circuit 401 can be minimized, resulting in a favorable image.

Even when the pixel A is a Ye filter, all of the peripheral pixels B to E are W filters (refer to FIG. 6) as in the case where the pixel A is a Cy filter. Accordingly, the luminance value at the pixel G can be obtained in the same manner as described for the case where the pixel A is a Cy filter.

Next, when the pixel A is a W filter, there are two cases where the pixel B and the pixel C are Cy filters and the pixel D and the pixel E are Ye filters, and where the pixel B and the pixel C are Ye filters and the pixel D and the pixel E are Cy filters. However, these cases are under the same condition when the image of FIG. 5 is rotated by 90 degrees, and the luminance value of the pixel G to be newly generated can be obtained by the same process and, therefore, only the case where the pixel B and the pixel C are Cy filters and the pixel D and the pixel E are Ye filters will be described hereinafter.

Figure 10:
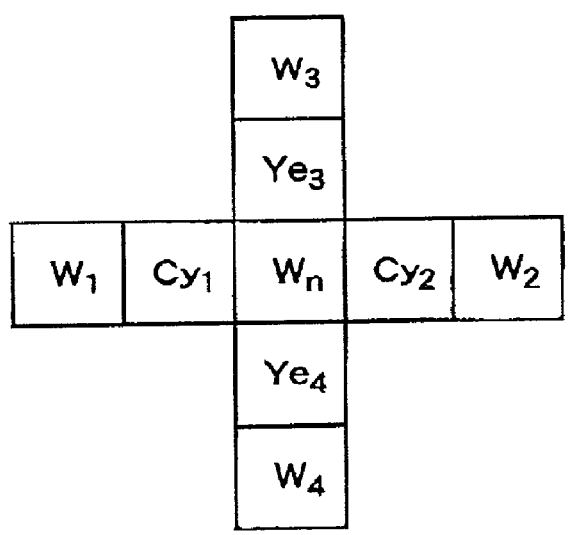
FIG. 10 is a diagram illustrating an example of arrangement of color filters on a CCD in the color image pickup device according to the second embodiment of the present invention.

The positional relationships among the filters in this case is shown in FIG. 10. FIG. 10 is a diagram illustrating arrangement of the color filters on the CCD in the color image pickup device according to the second embodiment of the present invention. In the first embodiment, when obtaining the amount of change in the luminance values in the horizontal direction, the difference between $Cy_1$ and $Cy_2$ shown in FIG. 9 is multiplied with the transmission ratio and the result is used to prevent the image from becoming blurred due to use of the luminance values obtained by arithmetic operation with the peripheral pixels. However, to simplify the arithmetic operation, this second embodiment employs $W_1$ and $W_2$ which are positioned outside $Cy_1$ and $Cy_2$, and the luminance values of which have already been known. That is, the amount of change in the luminance values in the horizontal direction is $(W_2-W_1)$. However, since $W_1$ and $W_2$ are by 4 pixels apart from each other, the amount of change for one pixel becomes $(W_2-W_1)/4$, and the amount of change DX for ¼ pixel becomes DX= $(W_2-W_1)/16$. Likewise, the amount of change DY for ¼ pixel in the vertical direction becomes $DY=(W_4-W_3)/16$. Even when the pixel A is a W Filter, as in the case where the pixel A is a Cy filter, the luminance values at 901, 902, 903, and 904 are obtained as follows, using DX, DY, and the luminance value of the pixel A.

| | |
|---|---|
| 901 | A − DX + DY |
| 902 | A + DX + DY |
| 903 | A − DX − DY |
| 904 | A + DX − DY |

As described above, the luminance value of a pixel to be newly generated is obtained by using the luminance value of a pixel that is positioned closest to the new pixel, which luminance value is obtained by arithmetic operation with the peripheral pixels in the signal processing circuit, and using the luminance values of pixels corresponding to W filters whose filter-transmitted signals can be used as luminance values. Therefore, blurs due to the influence of the peripheral pixels can be reduced, whereby a high-contrast and high-resolution luminance image is obtained and, moreover, resolution conversion can be realized by simple addition, subtraction, and shift operation.

The luminance values of the pixels corresponding to the W filters may be captured from any of the paths 110 and 111 shown in FIG. 1 because the luminance values outputted from the path 110 are identical to the values of the filter-transmitted signals outputted from the path 111.

While in the first embodiment the color-difference signal is obtained by linear interpolation, another method will be described in this second embodiment. In FIG. 5, assuming that the pixel to be newly generated is G, three pixels as follows are selected: a pixel with a W filter positioned closest to the pixel G, a pixel with a Cy filter positioned closest to the pixel G, and a pixel with a Ye filter positioned closest to the pixel G. As is apparent from the filter arrangement shown in FIG. 6, all of these pixels are always present in the 2×2 pixels including the G position. To obtain the color-difference signal at the pixel G, Cr and Cb are obtained using these values, according to formulae (3) and (4) that are identical to those used when the color-difference signal is obtained by the signal processing circuit 108 of the first embodiment.

$$Cr=(W-Cy)/0.3-W=(0.7W-Cy)/0.3 \quad (3)$$

$$Cb=(W-Ye)/0.1-W=(0.9W-Ye)/0.1 \quad (4)$$

As described above, since the color-difference signal of a pixel to be newly generated is obtained using the filter-transmitted signals of the pixels in the vicinity of the new pixel, no contrast is made and a sudden change is avoided with respect to colors to which the resolution of human eyes is low, whereby the image quality is prevented from being degraded due to a pseudo color or the like.

While the resolution conversion circuits according to the first and second embodiments perform different interpolations of luminance values and different interpolations of color-difference signals, respectively. However, as a matter of course, the combination of these interpolations may be changed. For example, the luminance value interpolation of the first embodiment may be combined with the color-difference signal interpolation of the second embodiment, or the luminance value interpolation of the second embodiment may be combined with the color-difference signal interpolation of the first embodiment.

APPLICABILITY IN INDUSTRY

A color image pickup device according to the present invention is provided with image pickup elements having color separation filters, respectively, wherein one array pattern of the color separation filters corresponds to four pixels that are vertically and horizontally adjacent to each other; a storage circuit for storing filter-transmitted signals corresponding to the respective pixels and supplied from the image pickup elements; a signal processing circuit for obtaining a luminance value and a color-difference signal for each pixel, using the filter-transmitted signals corresponding to the respective pixels and stored in the storage circuit; and a resolution conversion circuit for performing interpolation using the luminance values and color-difference signals outputted from the signal processing circuit, and the filter-transmitted signals corresponding to the respective pixels and outputted from the image pickup elements, thereby generating a luminance value and a color-difference signal corresponding to a pixel to be newly generated. Therefore, favorable processing result having no blur can be obtained with a very small amount of arithmetic.

What is claimed is:

1. A color image pickup device comprising:
   image pickup elements having color separation filters, respectively, wherein one array pattern of the color separation filters corresponds to four pixels that are vertically and horizontally adjacent to each other;

a storage circuit for storing filter-transmitted signals corresponding to the respective pixels and supplied from the image pickup elements;

a signal processing circuit for obtaining a luminance value and a color-difference signal for each pixel, using the filter-transmitted signals corresponding to the respective pixels and stored in the storage circuit; and a resolution conversion circuit for performing interpolation using the luminance values and the color-difference signals outputted from the signal processing circuit, and the filter-transmitted signals corresponding to the respective pixels and outputted from the image pickup elements, thereby generating a luminance value and a color-difference signal corresponding to a pixel to be newly generated.

2. A color image pickup device as defined in claim 1, wherein said resolution conversion circuit performs interpolation using the luminance value of a pixel that is placed in a position closest to the pixel to be newly generated, which luminance value is outputted from the signal processing circuit, and using the filter-transmitted signals corresponding to the peripheral pixels of the pixel placed in the position closest to the pixel to be newly generated, which filter-transmitted signals are outputted from the image pickup elements.

3. A color image pickup device as defined in claim 1, wherein the color separation filters corresponding to the four pixels forming each array pattern of the color separation filters on the image pickup elements are composed of two whole-color-transmission filters (hereinafter referred to as W filters) and two color filters, and the W filters and the color filters are arranged in a checker pattern.

4. A color image pickup device as defined in claim 3, wherein said color filters are a cyan-transmitting filter and a yellow-transmitting filter.

5. A color image pickup device as defined in claim 3 wherein, when the pixel placed in the position closest to the pixel to be newly generated is a color filter pixel, said resolution conversion circuit obtains the luminance value of the pixel to be newly generated, by calculating (a difference between filter-transmitted signals of W filter pixels adjacent to the color filter pixel)×(a factor based on the position of the pixel to be newly generated)+(the luminance value of the color filter pixel outputted from the signal processing circuit).

6. A color image pickup device as defined in claim 3 wherein, when the pixel placed in the position closest to the pixel to be newly generated is a W filter pixel, said resolution conversion circuit obtains the luminance value of the pixel to be newly generated, by calculating (a difference between filter-transmitted signals of color filter pixels adjacent to the W filter pixel)×(a factor based on the position of the pixel to be newly generated)+(the luminance value of the color filter pixel outputted from the signal processing circuit).

7. A color image pickup device as defined in claim 3 wherein, when the pixel placed in the position closest to the pixel to be newly generated is a W filter pixel, said resolution conversion circuit obtains the luminance value of the pixel to be newly generated, by calculating (a difference between filter-transmitted signals of W filter pixels that are placed with a color filter pixel between them)×(a factor based on the position of the pixel to be newly generated)+ (the luminance value of the color filter pixel outputted from the signal processing circuit).

8. A color image pickup device as defined in claim 1, wherein said resolution conversion circuit obtains a color-difference signal of the pixel to be newly generated, by performing linear interpolation using the color-difference signals obtained by the signal processing circuit.

9. A color image pickup device as defined in claim 1, wherein said resolution conversion circuit obtains a color-difference signal of the pixel to be newly generated, by using the filter-transmitted signals corresponding to the respective pixels and outputted from the image pickup elements.

10. A color image pickup device as defined in claim 2, wherein the color separation filters corresponding to the four pixels forming each array pattern of the color separation filters on the image pickup elements are composed of two whole-color-transmission filters (hereinafter referred to as W filters) and two color filters, and the W filters and the color filters are arranged in a checker pattern.

11. A color image pickup device as defined in claim 10, wherein said color filters are a cyan-transmitting filter and a yellow-transmitting filter.

12. A color image pickup device as defined in claim 11 wherein, when the pixel placed in the position closest to the pixel to be newly generated is a color filter pixel, said resolution conversion circuit obtains the luminance value of the pixel to be newly generated, by calculating (a difference between filter-transmitted signals of W filter pixels adjacent to the color filter pixel)×(a factor based on the position of the pixel to be newly generated)+(the luminance value of the color filter pixel outputted from the signal processing circuit).

13. A color image pickup device as defined in claim 11 wherein, when the pixel placed in the position closest to the pixel to be newly generated is a W filter pixel, said resolution conversion circuit obtains the luminance value of the pixel to be newly generated, by calculating (a difference between filter-transmitted signals of color filter pixels adjacent to the W filter pixel)×(a factor based on the position of the pixel to be newly generated)+(the luminance value of the color filter pixel outputted from the signal processing circuit).

14. A color image pickup device as defined in claim 11 wherein, when the pixel placed in the position closest to the pixel to be newly generated is a W filter pixel, said resolution conversion circuit obtains the luminance value of the pixel to be newly generated, by calculating (a difference between filter-transmitted signals of W filter pixels that are placed with a color filter pixel between them)×(a factor based on the position of the pixel to be newly generated)+ (the luminance value of the color filter pixel outputted from the signal processing circuit).

15. A color image pickup device as defined in claim 10 wherein, when the pixel placed in the position closest to the pixel to be newly generated is a color filter pixel, said resolution conversion circuit obtains the luminance value of the pixel to be newly generated, by calculating (a difference between filter-transmitted signals of W filter pixels adjacent to the color filter pixel)×(a factor based on the position of the pixel to be newly generated)+(the luminance value of the color filter pixel outputted from the signal processing circuit).

16. A color image pickup device as defined in claim 10 wherein, when the pixel placed in the position closest to the pixel to be newly generated is a W filter pixel, said resolution conversion circuit obtains the luminance value of the pixel to be newly generated, by calculating (a difference between filter-transmitted signals of color filter pixels adjacent to the W filter pixel)×(a factor based on the position of the pixel to be newly generated)+(the luminance value of the color filter pixel outputted from the signal processing circuit).

17. A color image pickup device as defined in claim 10 wherein, when the pixel placed in the position closest to be pixel to be newly generated is a W filter pixel, said resolution conversion circuit obtains the luminance value of the pixel to be newly generated, by calculating (a difference between filter-transmitted signals of W filter pixels that are placed with a color filter pixel between them)×(a factor based on the position of the pixel to be newly generated)+ (the luminance value of the color filter pixel outputted from the signal processing circuit).

18. A color image pickup device as defined in claim 4 wherein, when the pixel placed in the position closest to the pixel to be newly generated is a color filter pixel, said resolution conversion circuit obtains the luminance value of the pixel to be newly generated, by calculating (a difference between filter-transmitted signals of W filter pixels adjacent to the color filter pixel)×(a factor based on the position of the pixel to be newly generated)+(the luminance value of the color filter pixel outputted from the signal processing circuit).

19. A color image pickup device as defined in claim 4 wherein, when the pixel placed in the position closest to the pixel to be newly generated is a W filter pixel, said resolution conversion circuit obtains the luminance value of the pixel to be newly generated, by calculating (a difference between filter-transmitted signals of color filter pixels adjacent to the W filter pixel)×(a factor based on the position of the pixel to be newly generated)+(the luminance value of the color filter pixel outputted from the signal processing circuit).

20. A color image pickup device as defined in claim 4 wherein, when the pixel placed in the position closest to the pixel to be newly generated is a W filter pixel, said resolution conversion circuit obtains the luminance value of the pixel to be newly generated, by calculating (a difference between filter-transmitted signals of W filter pixels that are placed with a color filter pixel between them)×(a factor based on the position of the pixel to be newly generated)+ (the luminance value of the color filter pixel outputted from the signal processing circuit).

* * * * *